US008863939B2

(12) United States Patent
Panides et al.

(10) Patent No.: US 8,863,939 B2
(45) Date of Patent: Oct. 21, 2014

(54) SURFACE ROUGHNESS FOR IMPROVED VACUUM PRESSURE FOR EFFICIENT MEDIA HOLD-DOWN PERFORMANCE

(75) Inventors: Elias Panides, Whitestone, NY (US); Ruddy Castillo, Briarwood, NY (US); Joannes N. M. de Jong, Hopewell Function, NY (US); Lloyd A. Williams, Mahopac, NY (US); Liang-Bih Lin, Rochester, NY (US); Bin Zhang, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 257 days.

(21) Appl. No.: 12/637,218

(22) Filed: Dec. 14, 2009

(65) Prior Publication Data

US 2011/0139577 A1 Jun. 16, 2011

(51) Int. Cl.
*B65G 47/92* (2006.01)
*G03G 15/00* (2006.01)

(52) U.S. Cl.
CPC .................................... *G03G 15/657* (2013.01)
USPC ..................................... 198/689.1; 198/471.1

(58) Field of Classification Search
USPC ............................... 198/689.1, 471.1; 406/78
See application file for complete search history.

(56) References Cited

U.S. PATENT DOCUMENTS 2,555,319 A 6/1951 Cross
3,519,819 A * 7/1970 Gramza et al. .................. 430/50
3,605,194 A 9/1971 Nauta
3,787,229 A * 1/1974 Rudness ....................... 428/148
3,935,365 A * 1/1976 Eigenmann ................... 428/323
4,294,539 A * 10/1981 Spehrley, Jr. ................... 355/76
4,294,540 A * 10/1981 Thettu ............................. 355/76
4,295,737 A * 10/1981 Silverberg ...................... 355/76
4,298,277 A * 11/1981 Silverberg ...................... 355/76
4,440,492 A * 4/1984 Howard .......................... 355/76
4,678,176 A 7/1987 Roller
4,688,784 A 8/1987 Wirz
4,747,992 A * 5/1988 Sypula et al. ................. 264/130
4,903,074 A * 2/1990 Lama et al. ...................... 355/76
4,922,304 A * 5/1990 Gilbert et al. ................. 399/322
4,946,028 A * 8/1990 Eichmann et al. ......... 198/688.1
5,116,035 A * 5/1992 Russel et al. ................. 271/3.13
5,139,253 A * 8/1992 Bohme et al. ................. 271/197
5,423,255 A * 6/1995 Maass ........................... 101/232
5,620,176 A * 4/1997 Spoorenberg et al. .......... 271/98
6,425,580 B1 * 7/2002 Yaneda ......................... 271/276
6,681,094 B2 * 1/2004 Horrall et al. ................. 399/299
6,811,863 B2 11/2004 Rizika et al.
6,970,672 B2 * 11/2005 MacMillan et al. .......... 399/284
7,137,918 B2 * 11/2006 Nonnast et al. ............... 474/260
7,258,336 B2 8/2007 Moore et al.
7,896,767 B2 * 3/2011 Nakashima ................... 474/261
7,922,174 B2 * 4/2011 Panides et al. ................ 271/276

(Continued)

*Primary Examiner* — Joseph Dillon, Jr.
(74) *Attorney, Agent, or Firm* — MH2 Technology Law Group LLP

(57) ABSTRACT

Provided are vacuum transport systems, methods of making them and methods of transporting one or more objects. In accordance with various embodiments, there is a vacuum transport system including a vacuum plenum and one or more transport members configured to rotate around the vacuum plenum and wherein at least one of the one or more transport members can include a substrate, the substrate including a plurality of holes extending from a first side proximate to the vacuum plenum to a second side proximate to an object, wherein a surface of the second side comprises a textured surface having an average roughness Ra of about 2 μm to about 100 μm.

12 Claims, 10 Drawing Sheets

(56) References Cited

U.S. PATENT DOCUMENTS 8,413,794 B2 * 4/2013 Herrmann .................. 198/689.1
8,475,310 B2 * 7/2013 Shiriike et al. ................ 474/238
2004/0214676 A1 * 10/2004 Shiriike et al. ................ 474/260
2009/0048048 A1 * 2/2009 Nakamura et al. ............ 474/263
2010/0239764 A1 * 9/2010 Ichizawa et al. .............. 427/336
2010/0298079 A1 * 11/2010 Shiriike et al. ................ 474/238

* cited by examiner

SURFACE ROUGHNESS FOR IMPROVED VACUUM PRESSURE FOR EFFICIENT MEDIA HOLD-DOWN PERFORMANCE

FIELD OF USE

The present teachings relate generally to printing devices and, more particularly, to vacuum transport systems.

BACKGROUND

In direct marking systems, the media is held down flat while being printed and hence, media flatness is critical. Usually media is held down by vacuum and transported using media vacuum-transport systems. A typical media vacuum-transport system includes a belt which can be rotated around a vacuum plenum. The belt includes a plurality of holes and it is through the plurality of holes that a vacuum is applied and the media is held down by the vacuum. The interface of the media and the plurality of holes is an important parameter as it has a significant influence on other key vacuum force factors—such as blower size, hole pitch, hole diameter, total flow, etc. One of the disadvantages of conventional media vacuum-transport systems is that they normally employ smooth surfaces on belts, drums, etc., which creates a "sealing-off" effect, thus limiting the applied vacuum force to the area of the belt-holes only. As a result of the localized force application, transport systems have to use oversized blowers, large belt-holes, and inefficient patterns.

Hence, there is a need for a new method for enhancing vacuum pressure distribution for improved media and other objects hold down performance in a vacuum transport system.

SUMMARY

In accordance with various embodiments, there is a vacuum transport system including a vacuum plenum and one or more transport members configured to rotate around the vacuum plenum and wherein at least one of the one or more transport members can include a substrate, the substrate including a plurality of holes extending from a first side proximate to the vacuum plenum to a second side proximate to an object, wherein a surface of the second side can include a textured surface having an average roughness Ra of about 2 μm to about 100 μm.

According to another embodiment, there is a vacuum transport system including a vacuum plenum and one or more transport members configured to rotate around the vacuum plenum and wherein at least one of the one or more transport members can include a substrate, the substrate including a plurality of holes extending from a first side proximate to the vacuum plenum to a second side proximate to the media and a layer disposed over the second side of the substrate, wherein the layer can include a textured surface having an average roughness Ra of about 2 μm to about 100 μm and wherein the plurality of holes extend though the layer.

According to yet another embodiment, there is a method of making a vacuum transport member. The method can include providing a substrate, the substrate including a first side proximate to a vacuum plenum and a second side opposite the first side and forming a textured surface over a surface of the second side of the substrate, wherein the textured surface can have an average roughness Ra of about 2 μm to about 100 μm. The method can further include forming a plurality of holes extending from the first side of the substrate to the textured surface over the second side of the substrate.

In accordance with another embodiment, there is a method of transporting one or more objects. The method can include providing one or more transport members configured to rotate around a vacuum plenum, wherein at least one of the one or more transport members can include a substrate, the substrate including a plurality of holes extending from a first side proximate to the vacuum plenum to a second side proximate to the one or more objects to be transported, wherein a surface of the second side can include a textured surface having an average roughness Ra of about 2 μm to about 100 μm. The method can also include disposing one or more objects over the textured surface of the one or more transport members and holding onto the one or more objects by applying vacuum through the holes of the substrate to generate a suction force, wherein the textured surface can distribute the suction force substantially uniformly between the textured surface and the object. The method can further include transporting the one or more objects by rotating the one or more transport members around the vacuum plenum.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and together with the description, serve to explain the principles of the present teachings.

It should be noted that some details of the figures have been simplified and are drawn to facilitate understanding of the embodiments rather than to maintain strict structural accuracy, detail, and scale.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

In the following description, reference is made to the accompanying drawings that form a part thereof, and which are shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
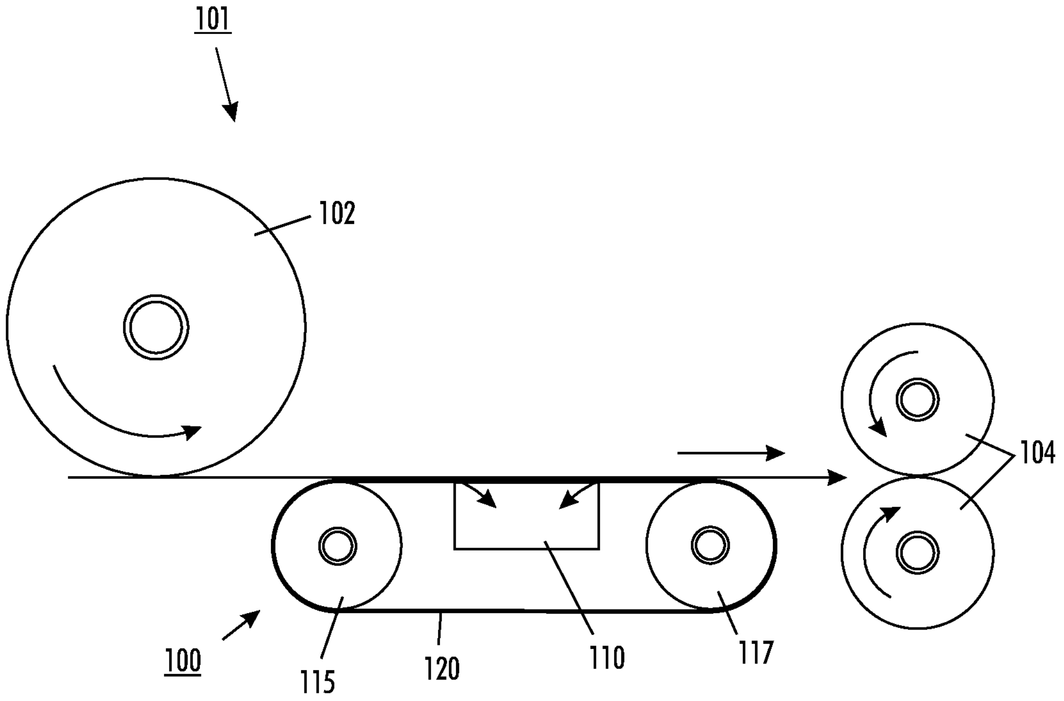
FIG. 1 schematically illustrates an exemplary vacuum transport system in a portion of a printing apparatus, according to various embodiments of the present teachings.

In many designs of copiers or printers, particularly of the high-speed variety, the preferred device for moving a sheet from the photoreceptor to the fuser is a vacuum transport system. FIG. 1 schematically illustrates an exemplary vacuum transport system 100 in a portion of a printing apparatus 101. As shown in FIG. 1, the vacuum transport system 100 can be disposed within a copier or printer between a photoreceptor 102 and fuser rolls 104. According to various embodiments, the vacuum transport system 100 can include a vacuum plenum 110 and one or more transport members 120 configured to rotate around the vacuum plenum 110. In some embodiments, the one or more transport members 120 can include a belt 120 which can be entrained about two or more rollers 115, 117, as shown in FIG. 1.

Figure 2A:
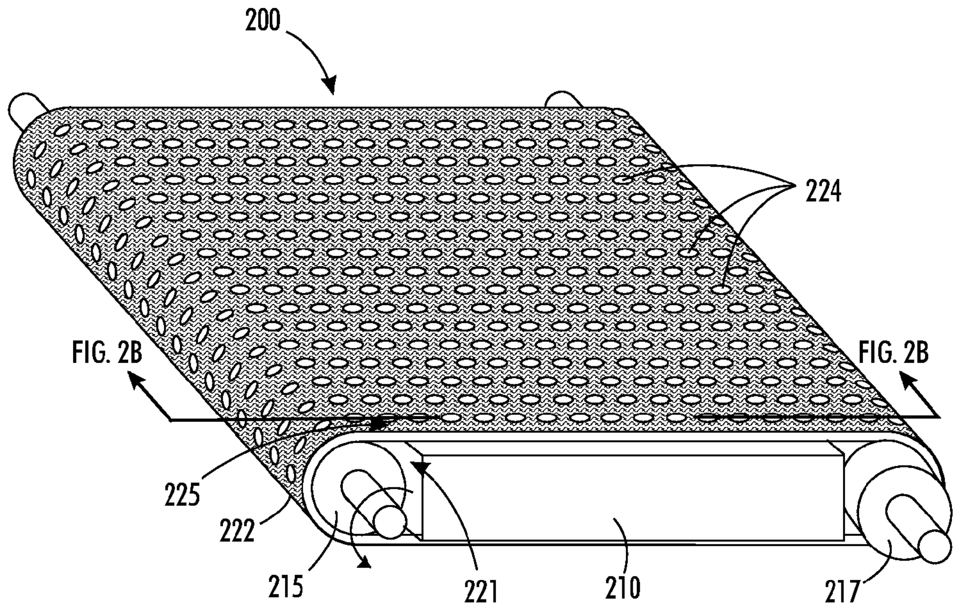
FIG. 2A is an isometric view of the exemplary vacuum transport system shown in FIG. 1, according to various embodiments of the present teachings.
Figure 2B:
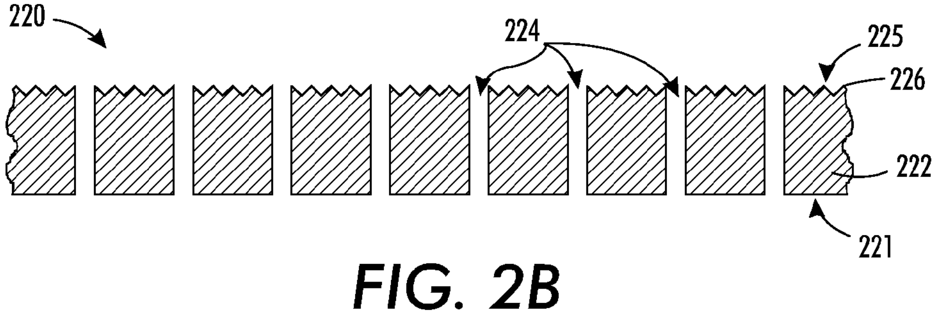
FIG. 2B schematically illustrates a cross section of an exemplary transport member shown in FIG. 2A, according to various embodiments of the present teachings.

FIG. 2A is an isometric view of the exemplary vacuum transport system 100 shown in FIG. 1, according to various embodiments of the present teachings. FIG. 2B schematically illustrates a cross section of the exemplary transport member 220 shown in FIG. 2A, according to various embodiments of the present teachings. As shown in FIG. 2A, the vacuum transport system 200 can include a transport member 220 which can be entrained about two or more rollers 215, 217 and configured to rotate around the vacuum plenum 210. In various embodiments, the transport member 220 can include a substrate 222 having a plurality of holes 224 extending from a first side 221 proximate to the vacuum plenum 210 to a second side 225 opposite the first side and proximate to an object (not shown) to be transported. In some embodiments, the object can be a media, such as, for example, in a printing apparatus 101 including a media vacuum transport system 100. The number, size and arrangement of the plurality of holes 224 can vary as known in the art to efficiently acquire various types of objects. In some embodiments, the plurality of holes 224 can have a size ranging from about 0.2 mm to about 2.0 mm or about 0.3 mm to about 1.8 mm or from about 0.4 mm to about 1.5 mm. In various embodiments, a surface of the second side 225 of the substrate 222 can include a textured surface 226. In some embodiments, the textured surface 226 can have an average roughness Ra of about 2 μm to about 100 μm or from about 5 μm to about 75 μm or from 8 μm to about 50 μm. In various embodiments, the roughness can have uniform spatial frequency and can depend on various factors, such as, for example, desired object flatness level, the belt thickness, the available vacuum pressure, etc. The spatial distribution of the roughness of the textured surface 226 can be in accordance with the application. For applications that require very small gaps in the order of a few hundred microns, the roughness must have only high spatial frequencies (small wavelengths) because low spatial frequencies (large wavelengths) can result in gap variations. However, very high spatial frequency can result in a decrease in the air flow within the gap which, in turn, can result in a decrease in the vacuum pressure.

Figure 2C:
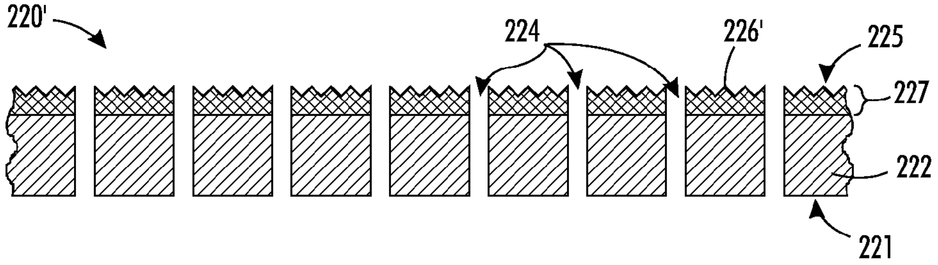
FIG. 2C schematically illustrates a cross section of another embodiment of the exemplary transport member shown in FIG. 2A, in accordance with the present teachings.

In certain embodiments, the textured surface 226 can include one or more features having a cross-sectional shape including, but not limited to, a square, rectangular, circle, triangle, and star. In some embodiments, the textured surface 226 can include a knurled surface. In other embodiments, the textured surface 226 can include a plurality of microgrooves. In some other embodiments, the textured surface 226 can include a plurality of particles. FIG. 2C schematically illustrates a cross section of another embodiment of the exemplary transport member 220 shown in FIG. 2A. As, shown in FIG. 2C, the transport member 220' can further include a layer 227 disposed over the second side 225 of the substrate 222 such that the plurality of holes 224 extend though the layer 227. In various embodiments, the layer 227 can include a textured surface 226' having an average roughness Ra of about 2 μm to about 100 μm or from about 5 μm to about 75 μm or from 8 μm to about 50 μm. In certain embodiments, an adhesive layer (not shown) can be disposed between the substrate 222 and the layer 227. In some embodiments, the textured surface 226' of the layer 227 can include a knurled surface. In other embodiments, the textured surface 226' of the layer 227 can include a plurality of microgrooves. In some other embodiments, the textured surface 226' of the layer 227 can include a plurality of particles dispersed in a resin.

The vacuum plenum 210 can be actuated by a motor (not shown) and thereby can draw air through the holes 224 in the transport member 220 particularly in the area where an object (not shown) moving in a process direction is passing over the transport member 220. In this way, the vacuum plenum 210 can hold the object against the second side 225 of the transport member 220, while the transport member 220 moves that object, for example a media from the photoreceptor 102 towards the nip of fuser rolls 104, as shown in FIG. 1.

While not intending to be bound by any specific theory, it is believed that the textured surface 226 can spread the vacuum between the holes 224 to provide substantially uniform suction force distributed substantially throughout the object that need to be held and/or transported. The roughness of the textured surface 226 can result in an elevation of the object above the holes 224, allowing for air to flow within the gap which, in turn, can distribute the vacuum pressure over a larger area and can prevent the object from "sealing-off" the applied suction force. Furthermore, the vacuum pressure over the larger area can increase the object hold down force for the same amount of vacuum pressure. This higher object hold down force is especially important in areas where the object profile height and/or accurate acquisitions are required, such as, for example in direct marking systems. Also, the higher object hold down loads can result in reduction of cost due to the need for lower vacuum pressure.

The vacuum transport system 200 as shown in FIG. 2A including transport members 220, 220' can be used in a wide variety of applications requiring holding and/or transporting of an object, such as, for example, transporting media in a printer; holding media while being printed in a direct marking system; transporting wafers and/or chips in a semiconductor fabrication; transporting and/or printing of packages and/or labels in packaging industry. Hence, as used herein, the term "object" can refer to any suitable material that need to be held or transported, including, but not limited to, various forms of media, such as, for example, plain paper, coated paper, no tear paper, wood, plastics, fabrics, textile products, polymeric films such as polyethylene film, polyethylene terepthalate, polyethylene naphthalate, polystyrene, polycarbonate, polyethersulfone, inorganic substrates such as metals, glass, ceramics, and the like; packages; packaging materials; semiconductor wafers, chips, and circuit boards. The object may have any suitable shape such as planar (e.g., a sheet) or non-planar (e.g., cube, scroll, and a curved shape).

Figure 3:
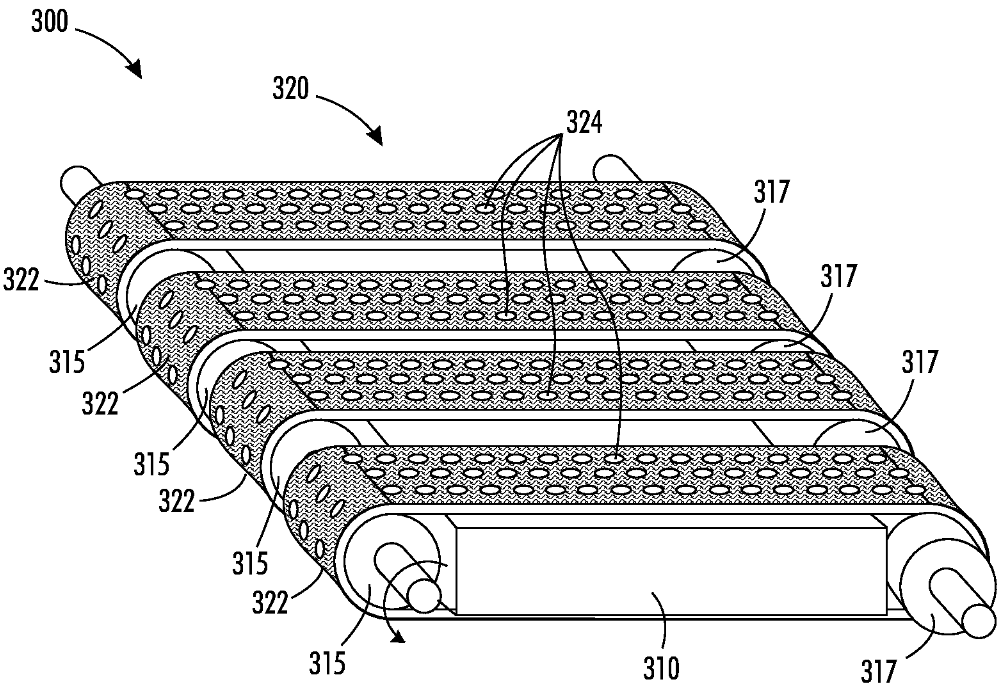
FIG. 3 is an isometric view of another exemplary vacuum transport system, according to various embodiments of the present teachings, according to various embodiments of the present teachings.

FIG. 3 is an isometric view of another exemplary vacuum transport system 300, according to various embodiments of the present teachings, according to various embodiments of the present teachings. The vacuum transport system 300 can include a plurality of transport members 320, which can be entrained about two or more rollers 315, 317 and configured to rotate around the vacuum plenum 310. Each of the plurality of transport members 320 can include a substrate 322 having a plurality of holes 324 extending from a first side proximate to the vacuum plenum 310 to a second side proximate to an object (not shown). In some embodiments, the one or more transport members 320 can also include a textured surface, for example the textured surface 226, as shown in FIG. 2B. In other embodiments, the one or more transport members 320 can also include a layer including a textured surface disposed over the second side of the substrate such that the plurality of holes extend though the layer, for example the layer 227 having the textured surface 226' disposed over the second side 225 of the substrate 222, as shown in FIG. 2C. The vacuum plenum 310 can be actuated by a motor (not shown) and thereby can draw air through the holes 324 in the one or more transport members 320 particularly in the area where the object (not shown) moving in a process direction in is passing over the one or more transport members 320.

In some embodiments, the one or more transport members 220, 320 can be a belt. In other embodiments, the one or more transport members 220, 320 can be a cylindrical drum. Any suitable material compliable or non-compliable can be used for the substrate 222, 322 In various embodiments, the substrate 222, 322 can include materials, such as, for example, polyethylene terephthalate (PET), polyethylene naphthalene (PEN), polysulfone (PS), polyimide (PI), polyamideimide (PAI), polyetherimide (PEI), and the like. In other embodiments, the substrate 222, 322 can be a metal substrate, such as, for example, steel, iron, and aluminum.

Figure 4:
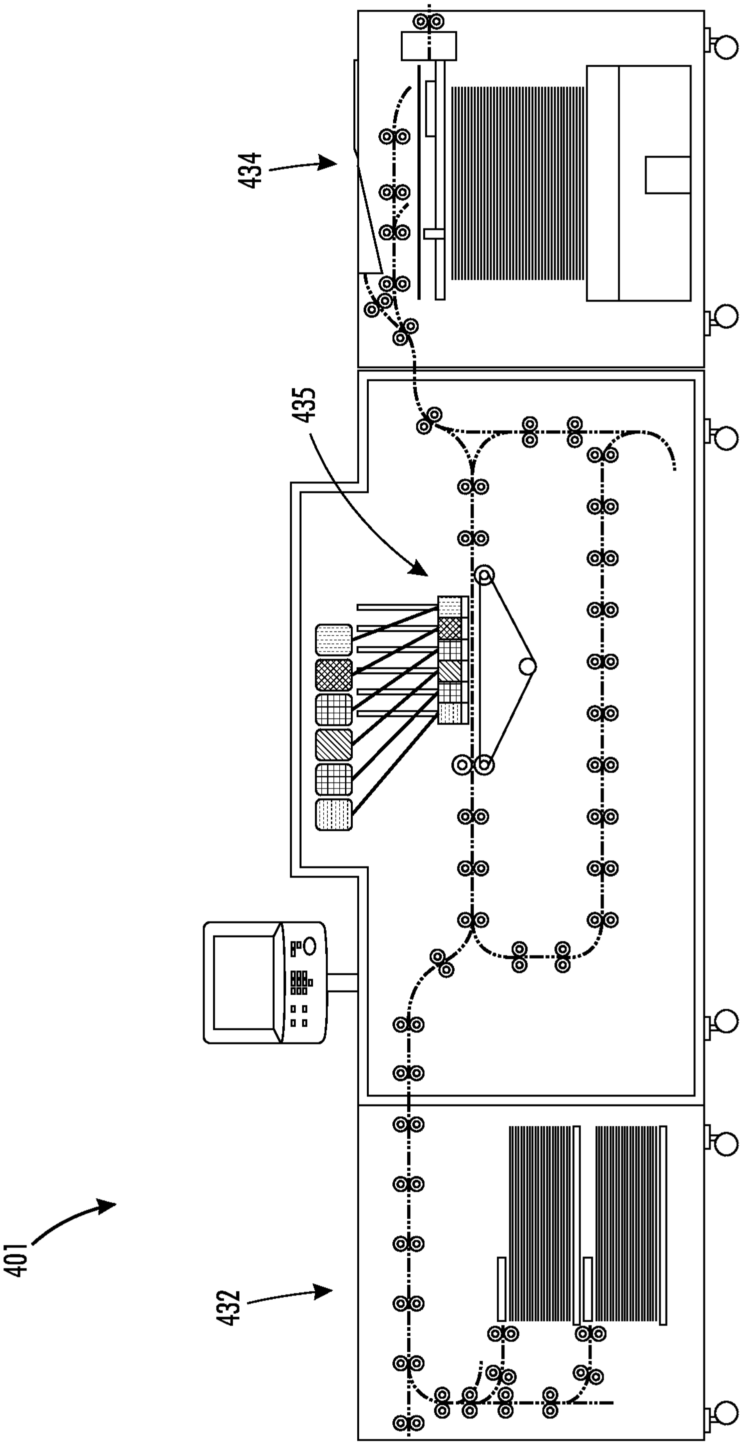
FIG. 4 schematically illustrates an exemplary direct to paper printing architecture, according to various embodiments of the present teachings.

FIG. 4 schematically illustrates an exemplary direct to paper printing architecture 401, according to various embodiments of the present teachings. The direct to paper printing architecture 401 can include a media feeder assembly 432 providing media to the media transport system 400. The media transport system 400 can be disposed under an ink-jet print head assembly 435, where media can be held while being printed on to followed by transport to the finisher 434. In various embodiments, the media transport system 400 can include one or more transport members, such as, for example, the transport member 220, as shown in FIG. 2B. In some embodiments, the one or more transport members of the media transport system 400 can also include a textured surface, for example the textured surface 226, as shown in FIG. 2B. In other embodiments, the one or more transport members of the media transport system 400 can also include a layer including a textured surface, for example the layer 227 having a textured surface 226', as shown in FIG. 2C.

Figure 5:
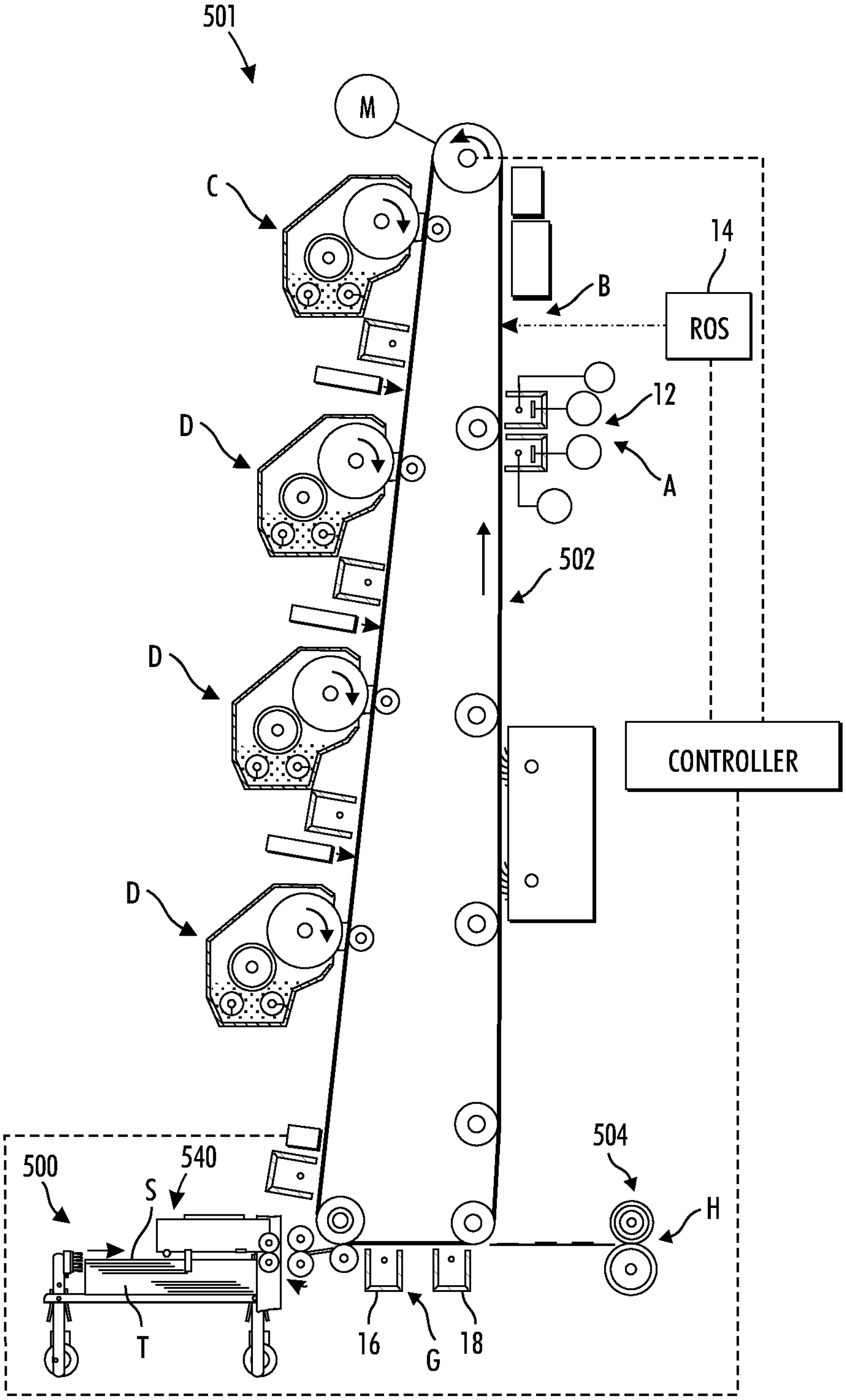
FIG. 5 schematically illustrates an exemplary full color image-on-image single pass electrophotographic printing apparatus, according to various embodiments of the present teachings.

FIG. 5 schematically illustrates an exemplary full color image-on-image single pass electrophotographic printing apparatus 501, according to various embodiments of the present teachings. In the exemplary printing apparatus 501 or reproduction machine, as shown in FIG. 1, a photoconductive member or belt 502 can be charged at a charging station A to a substantially uniform potential so as to sensitize the surface thereof. At a station B, the charged portion of the photoconductive member 502 can be exposed to a light image of an original document being reproduced obtained from a scanning device, such as a raster output scanner 14. Exposure of the charged photoconductive member 502 can selectively dissipate the charges thereon in the irradiated areas thereby recording an electrostatic latent image on the photoconductive member 502 corresponding to the informational areas contained within the original document. After the electrostatic latent image is recorded on the photoconductive member 502, the latent image can be developed by bringing a developer material into contact therewith at a series of developer stations C and D. Generally, the developer material can include toner particles adhering triboelectrically to carrier granules. The toner particles can be attracted from the carrier granules to the latent image forming a toner powder image on the photoconductive member 502. The toner powder image can then be transferred from the photoconductive member 502 to a media. The toner particles can then be heated to permanently affix the powder image to the media. For a typical black and white electro-photographic printing machine, a single development station C may be provided. On the other hand, with the advent of multicolor electrophotography, multiple additional development stations D may be provided that fix color toner to the photoconductive member 502.

Subsequent to image development, a sheet S of support material can be moved using a sheet feeder apparatus 500 into contact with the toner images at a transfer station G. At the transfer station G, a transfer dicorotron 16 can spray positive ions onto the backside of the sheet S which thereby attracts the negatively charged toner particle images from the photoreceptor 502 to the sheet S. A detack corotron 18 can be provided for facilitating stripping of the sheet S from the surface of the photoreceptor 502. After transfer, the sheet S can travel to a fusing station H where a heated fuser roller assembly 504 can permanently affix the toner powder to the sheet S.

Figure 6:
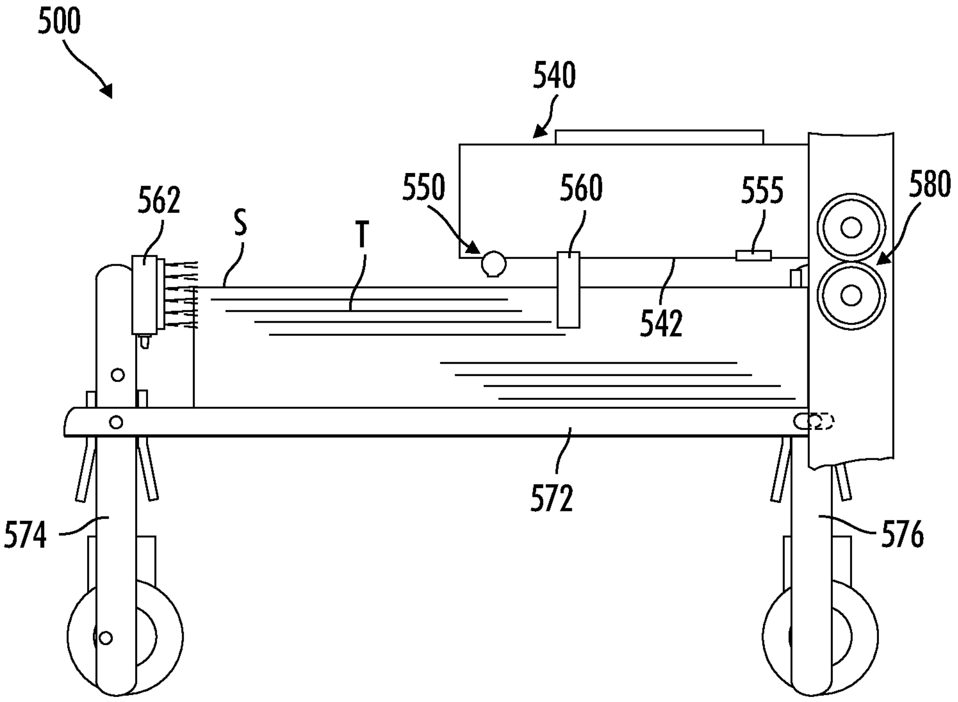
FIG. 6 shows a schematic illustration of a side view of an exemplary sheet feeder apparatus incorporated into the printing apparatus of FIG. 5, according to various embodiments of the present teachings.

Referring back to the sheet feeder apparatus 500, FIG. 6 shows a side elevational view of the exemplary sheet feeder apparatus 500, according to various embodiments of the present teachings. The basic components of the sheet feeder apparatus 500 can include a sheet support tray 572, which may be tiltable and self adjusting to accommodate various sheet types and characteristics; multiple tray elevator mechanisms 574, 576; a vacuum shuttle feedhead 540; a lead edge multiple range sheet height sensor 555; a multiple position stack height sensor 550; a variable acceleration take away roll (TAR) 580; inboard and outboard sheet fluffers 560, and trail edge fluffer 562. The feedhead 540 shown in FIGS. 5 and 6 can be a top vacuum corrugation feeder (VCF), so distance control of the top sheets in the stack T from the acquisition surface 542 and the fluffer jets 560 and 562 can be important. The acquisition surface 542 is the functional surface on the feedhead 540 or vacuum plenum. The two sensors 550, 555 together enable the paper supply to position the stack T. The multi-position stack height sensor 550 contacts the sheet stack T to detect two or more specific stack heights. This sensor 550 works in conjunction with the second sensor 555 near the stack lead edge which also senses the distance to the top sheet, but without sheet contact. The two sensors together enable the paper supply to position the stack T with respect to an acquisition surface 542 of the feed head 540, both vertically and angularly in the process direction. This height and attitude control greatly improves the capability of the feeder 500 to cope with a wide range of paper basis weight, type, and curl.

The feedhead 540 can acquire individual sheet S of media (using vacuum) from the top of a stack T and transports it forward to the TAR 580. The feedhead 540 can also include a vacuum source (not shown), the vacuum source being selectively actuatable to acquire and release the top sheet S from the stack T.

Figure 7:
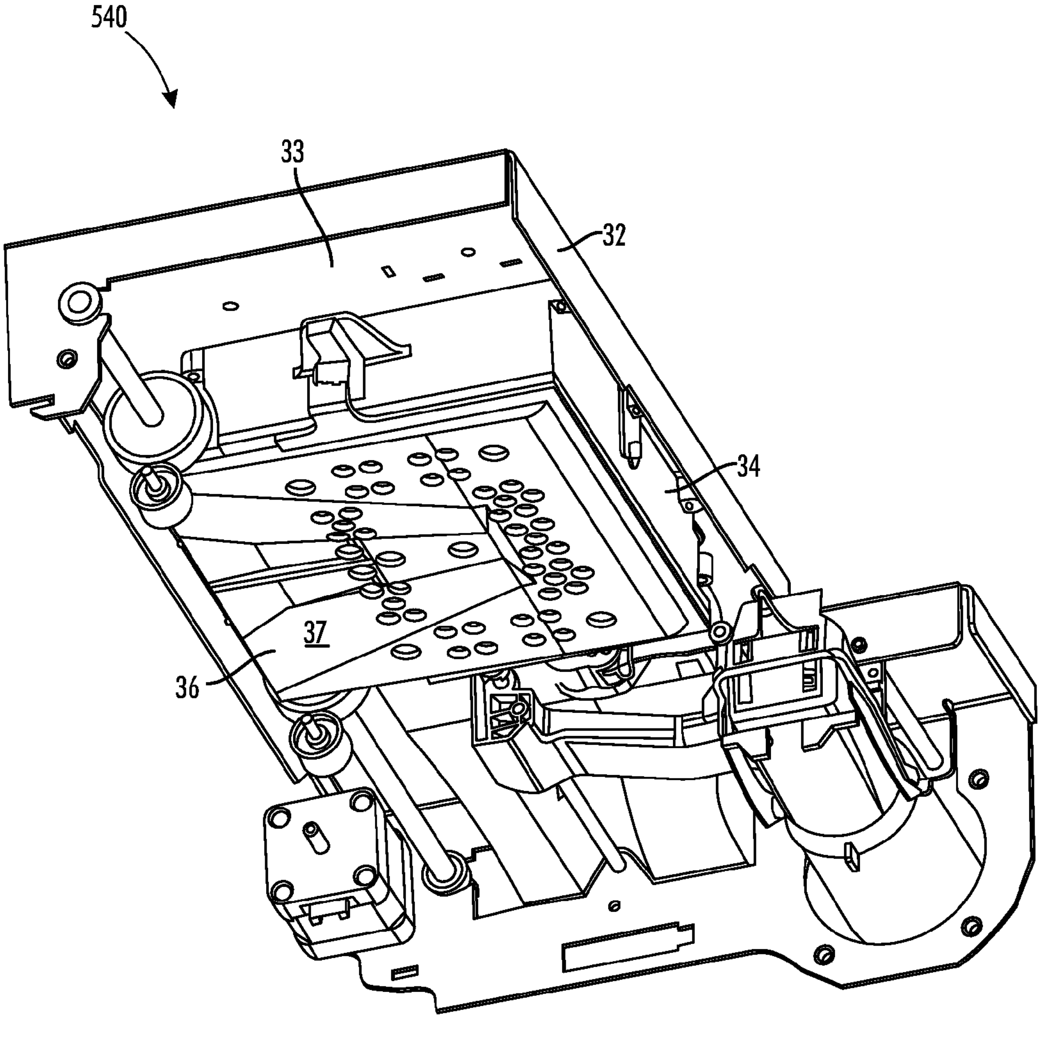
FIG. 7 is a bottom perspective of an exemplary feedhead shown in FIG. 6, in accordance with various embodiments of the present teachings.

FIG. 7 is a bottom perspective of the exemplary feedhead 540 shown in FIG. 6. The feedhead 540 can include a frame 32 that supports the components of the assembly within a particular machine. A plenum 34 can be supported on the underside of a top plate 33 of the frame 32 in communication with a vacuum duct (not shown). The feedhead 540 can also include a slide plate 36 that closes the lower opening of the plenum 34, as shown in FIG. 7. The slide plate 36 can include a plurality of apertures 38 through which the vacuum or suction can be applied to engage a sheet S and an acquisition surface 37 arranged to face the sheet S to be acquired and conveyed. The acquisition surface 37 can also include a textured surface, such as, for example the textured surface 226 shown in FIG. 2B. In some embodiments, the acquisition surface 37 can also include a layer including a textured surface, for example the layer 227 having a textured surface 226' shown in FIG. 2C. The number, size and arrangement of the apertures 38 can be known in the art to efficiently corrugate and acquire various types of sheet material. U.S. Pat. No. 7,258,336 discloses in detail the sheet feeder apparatus 500 and feedhead 540, the disclosure of which is incorporated by reference herein in their entirety.

The use of one or more transport members having a textured surface can enhance vacuum pressure distribution in a vacuum transport system, such as for example, vacuum transport system 100, 200 shown in FIGS. 1 and 2 and sheet feeder apparatus 500, shown in FIGS. 5 and 6.

According to various embodiments, there is a method of making a vacuum transport member, such as for example, vacuum transport member 220, 220', 320 as shown in FIGS. 2A, 2B, 2C, and 3. The method can include providing a substrate 222, the substrate 222 having a first side 221 proximate to the vacuum plenum 210 and a second side 225 opposite the first side and forming a textured surface 226 over a surface of the second side 225 of the substrate 222, wherein the textured surface 226 can have an average roughness Ra of about 2 μm to about 100 μm or from about 5 μm to about 75 μm or from 8 μm to about 50 μm. Any suitable method can be used for forming the textured surface including, but not limited to, knurling, photolithography, e-beam lithography, soft lithography, and molding. In some embodiments, the step of forming the textured surface can include depositing a layer 227 over the second side 225 of the substrate 222, as shown in FIG. 2C, wherein the layer 227 can include a textured surface 226' having an average roughness Ra of about 2 μm to about 100 μm or from about 5 μm to about 75 μm or from 8 μm to about 50 μm. The layer 227 including the textured surface 226' can be deposited by any suitable method including, but not limited to, knurling, photolithography, e-beam lithography, soft lithography, and molding. In other embodiments, the layer 227 including the textured surface 226' can be deposited by depositing a resin including a plurality of particles. In some embodiments, the step of forming the layer 227 including the textured surface 226' can further include depositing an adhesive layer (not shown) between the substrate 222 and the layer 227. The method can also include forming a plurality of holes 224 extending from the first side 221 of the substrate 222 to the textured surface 226 over the second side 225 of the substrate 222. Any suitable method can be used to form the plurality of holes, such as, for example, laser drilling.

According to some embodiments, there is a method of transporting one or more objects. The method can include providing one or more transport members configured to rotate around a vacuum plenum, such as for example, vacuum transport member 220, 220', 320 as shown in FIGS. 2A, 2B, 2C, and 3. In various embodiments, at least one of the one or more transport members can include a substrate 222, the substrate 222 having a first side 221 proximate to the vacuum plenum 210 and a second side 225 proximate to one or more objects to be transported and wherein a surface of the second side 225 can include a textured surface 226 having an average roughness Ra of about 2 μm to about 100 μm or from about 5 μm to about 75 μm or from 8 μm to about 50 μm. The method can also include disposing one or more objects over the textured surface 226 of the one or more transport members 220. In various embodiments, the one or more objects can include, but are not limited to, various kinds of media, packaging materials, packages, semiconductor wafers, chips, and circuit boards. The method can further include holding onto the one or more objects (not shown) by applying vacuum through the holes 224 of the substrate 222 to generate a suction force, wherein the textured surface 226 can distribute the suction force substantially uniformly between the textured surface 226 and the one or more objects. As used herein the term "suction force" refers to the vacuum suction force, created by the application of vacuum through the holes 224 of the substrate 222. In a smooth substrate without any roughness, the suction force is localized around the holes 224. However, roughness lifts the one or more objects above the holes 224 and provides pathways for air circulation and hence for substantially uniform distribution of suction. The method can also include transporting media by rotating the one or more transport members 220 around the vacuum plenum 210.

Figure 8A:
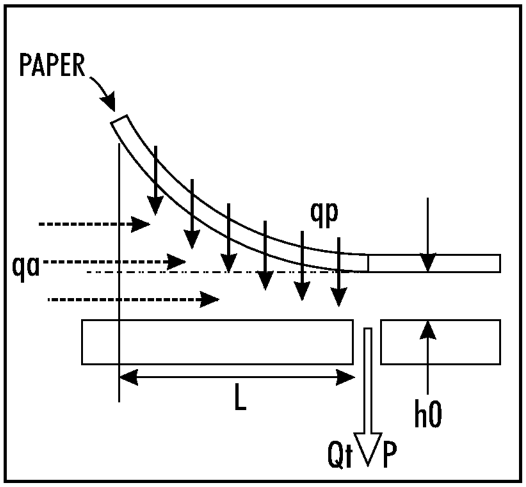
FIG. 8A schematically illustrates model conditions for the static pre-curled sheet and FIG. 8B shows the resulting vacuum pressure distribution profiles.
Figure 8B:
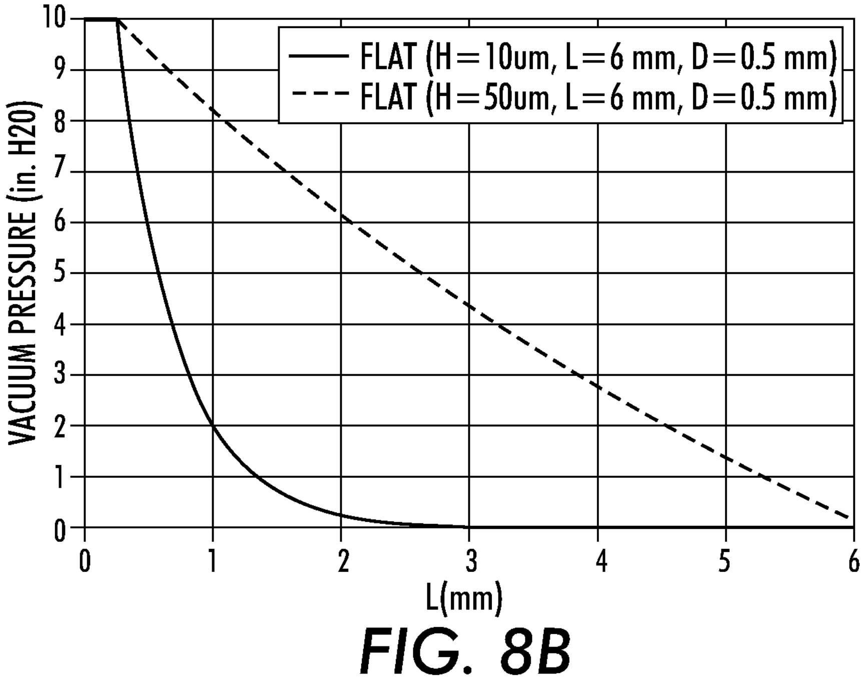

Numerical (fluid) axis-symmetric model of a single vacuum hole was used to explore the relative affect of "surface roughness", which is simulated as a "paper/plate" gap between the media and hole surface. FIG. 8A schematically illustrate model conditions for the static pre-curled sheet and FIG. 8B shows the resulting vacuum pressure distribution profiles (from the center of a hole) as a function of "radial distance". In FIG. 8A, $q_p$ and $q_a$ represent the air flow vectors through the paper and the ambient gap, respectively. FIG. 8B shows that increasing the "paper/plate gap" from 10 μm (solid profile) to 50 μm (dotted profile) dramatically improved the vacuum pressure distribution. In other words by "elevating" the media above the vacuum hole there can be a significant increase in the cross-sectional area over which the applied vacuum pressure can be distributed with a resulting large increase in the suction force. Similar results were also obtained in an experiment, where two samples with different surface roughness were compared.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Effect of Belt Roughness on the Resulting Vacuum Pressure Distribution

Figure 9A:
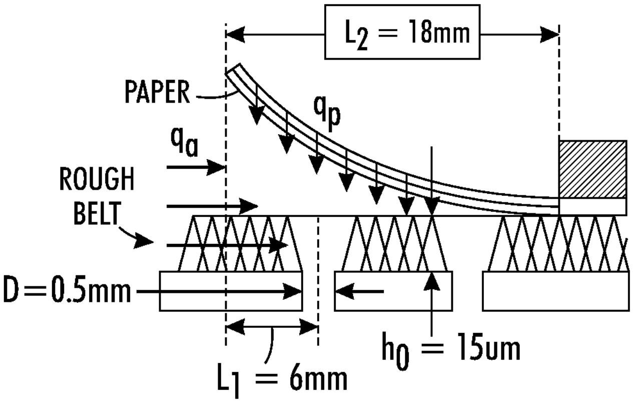
FIGS. 9A and 9B schematically illustrate a side view and a top view respectively of an exemplary embodiment used to study the effect of belt roughness on the resulting vacuum pressure distribution.
Figure 9B:
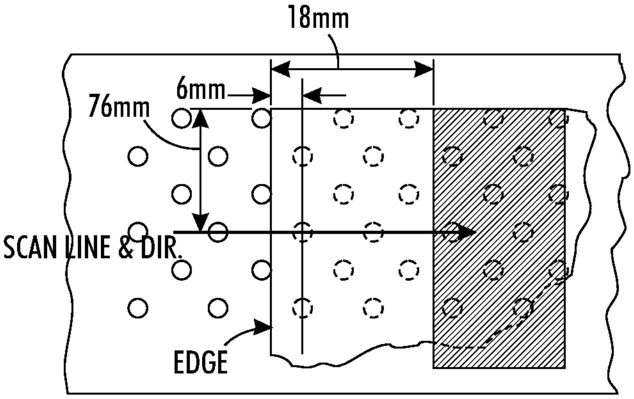
Figure 9C:
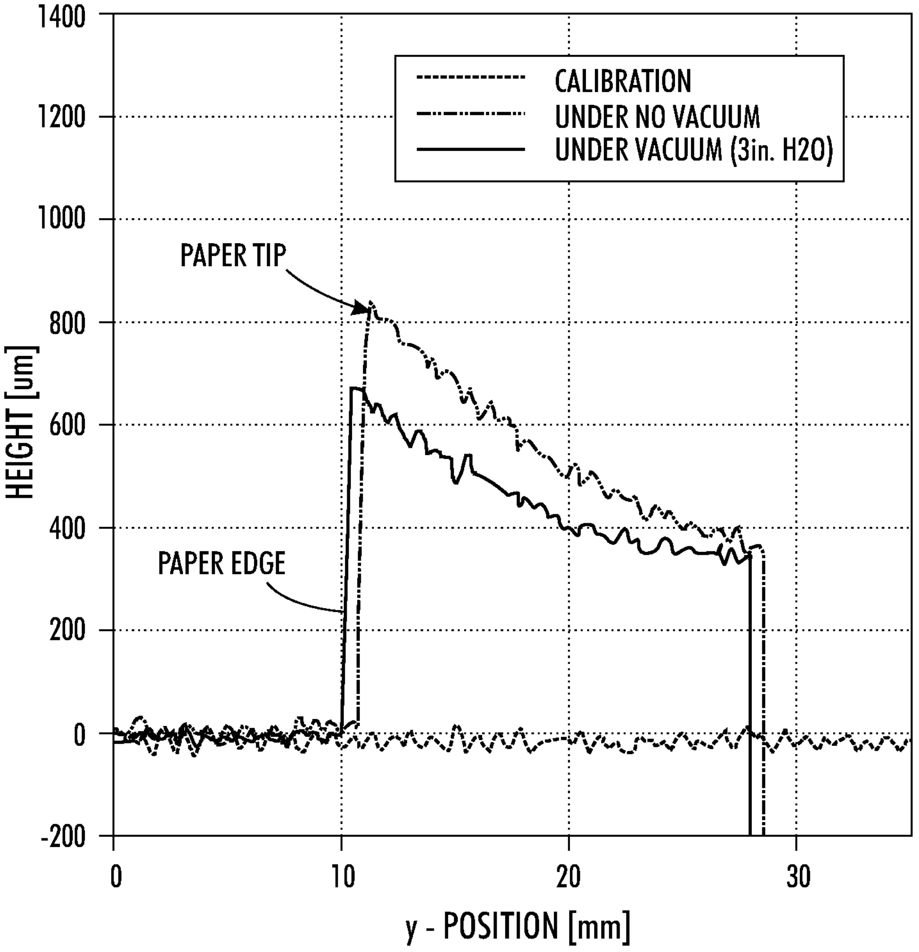
FIG. 9C shows a graph showing the effect of vacuum pressure on paper tip height for the exemplary embodiment shown in FIGS. 9A and 9B.

FIGS. 9A and 9B schematically illustrate a side view and a top view respectively of an exemplary embodiment used to study the effect of belt roughness on the resulting vacuum pressure distribution. As shown in FIG. 9A, up-curled paper was used (about 300 gsm or about 110# and initial laying curl of about 4 mm). Additionally, a steel plate was used to simulate a tangency point at a distance of 18 mm from the edge and a vacuum hole at 6 mm from the edge. In FIG. 9A, $q_p$ and $q_a$ represent the air flow vectors through the paper and the ambient gap, respectively. First, the belt surface (with no paper) was scanned with a displacement sensor LK-031/LK-2001 (KEYENCE CORPORATION OF AMERICA, Woodcliff Lake, N.J.) as a calibration step. Then a pre-curled paper (300 gsm or 110# and initial laying curl of about 4 mm) was disposed on the belt surface and aligned to desired orientation. The paper was then scanned on belt with no vacuum. FIG. 9C shows the no vacuum curve (dotted line). Then, the vacuum was activated and the paper was rescanned to see the effect of vacuum, as shown by the vacuum curve (dashed line). The process was repeated for two rough belt surfaces with roughness of about 15 μm and about 2 μm. Table 1 summarizes the effect of pressure on the vacuum distribution.

TABLE 1

| Run | Roughness gap (μm) | Vacuum Pressure (In. $H_2O$) | Tip height with no vacuum (μm) | Tip height with vacuum (μm) | Paper tip displacement (μm) |
|---|---|---|---|---|---|
| 1 | 15 | 3 | 800 | 680 | 120 |
| 2 | 15 | 6 | 800 | 580 | 220 |
| 3 | 2 | 3 | 800 | 790 | 10 |
| 4 | 2 | 6 | 800 | 630 | 170 |

As summarized in Table 1, comparing Run1 with Run3, i.e. the belt with a roughness of about 15 μm with the belt with a roughness of about 2 μm at a vacuum pressure of about 3 In.$H_2O$, it can be concluded that the belt with higher roughness (about 15 μm) has a more pronounced effect on the paper tip displacement or change in tip height. This indicates that under the same conditions of media and pressure there is a better pressure distribution and overall performance with the rougher material, as it was also observed in the numerical simulations shown in FIG. 8B. Furthermore, comparing Run4 with Run1, the data indicates that higher vacuum pressure is required with the smoother surface (about 2 μm) to achieve roughly the same paper tip displacement as compared with a rougher surface (about 15 μm). In other words, for the same vacuum pressure a smaller blower maybe required with a rough substrate.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms “including”, “includes”, “having”, “has”, “with”, or variants thereof are used in either the detailed description and the claims, such terms are intended to be inclusive in a manner similar to the term “comprising.” As used herein, the term “one or more of” with respect to a listing of items such as, for example, A and B, means A alone, B alone, or A and B. The term “at least one of” is used to mean one or more of the listed items can be selected.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A vacuum transport system comprising:

a vacuum plenum;

one or more transport members configured to rotate around the vacuum plenum and wherein at least one of the one or more transport members comprises:

a substrate, the substrate comprising a plurality of holes having a size ranging from 0.2 mm to 2.0 mm extending from a first side proximate to the vacuum plenum to a second side proximate to an object placed on the second side of the substrate, wherein the second side comprises a resin layer comprising a plurality of dispersed particles to provide a textured surface having an average roughness Ra of from 2 μm to 100 μm;

the vacuum plenum is configured to apply a vacuum through the plurality of holes to the second side proximate to the object; and the textured surface is configured to elevate the object above the plurality of holes and to spread the vacuum across the second surface between the plurality of holes to provide a substantially uniform suction force distributed across a surface of the object.

2. The vacuum transport system of claim 1, wherein:

the textured surface comprises one or more protrusive or intrusive features; and the textured surface is further configured to prevent the object from sealing off the vacuum applied through the plurality of holes and across the second surface between the plurality of holes.

3. The vacuum transport system of claim 1, wherein the textured surface comprises one or more features having a cross-sectional shape selected from the group consisting of a square, rectangle, circle, triangle, and star.

4. The vacuum transport system of claim 1, wherein a roughness of the textured surface has a uniform spatial frequency.

5. The vacuum transport system of claim 1, wherein the substrate has a shape selected from the group consisting of a cylinder and a belt.

6. The vacuum transport system of claim 1, wherein the object is selected from the group consisting of media, packaging material, wafer, chip, and circuit board.

7. A vacuum transport system comprising:

a vacuum plenum;

one or more transport members configured to rotate around the vacuum plenum and wherein at least one of the one or more transport members comprises:

a substrate, the substrate comprising a plurality of holes having a size ranging from 0.2 mm to 2.0 mm extending from a first side proximate to the vacuum plenum to a second side proximate to an object placed on the second side of the substrate; and a layer disposed over the second side of the substrate, wherein the layer comprises a plurality of dispersed particles to provide a textured surface having an average roughness Ra of from 2 μm to 100 μm, and the plurality of holes extend though the layer;

the vacuum plenum is configured to apply a vacuum through the plurality of holes to the second side proximate to the object; and the layer disposed over the second side of the substrate is configured to elevate the object above the plurality of holes and to spread the vacuum across the second surface between the plurality of holes to provide a substantially uniform suction force distributed across a surface of the object.

8. The vacuum transport system of claim 7, wherein:

the textured surface of the layer comprises one or more protrusive or intrusive features; and the textured surface is further configured to prevent the object from sealing off the vacuum applied through the plurality of holes and across the second surface between the plurality of holes.

9. The vacuum transport system of claim 7, wherein the textured surface of the layer comprises one or more features having a cross-sectional shape selected from the group consisting of a square, rectangle, circle, triangle, and star.

10. The vacuum transport system of claim 7, wherein a roughness of the textured surface has a uniform spatial frequency.

11. The vacuum transport system of claim 7 further comprising an adhesive layer disposed between the substrate and the layer.

12. The vacuum transport system of claim 7, wherein the object is selected from the group consisting of media, packaging material, wafer, chip, and circuit board.

* * * * *